Sept. 13, 1966   H. J. CAKORA   3,272,147
CART SYSTEM FOR FOUNDRIES OR THE LIKE
Filed May 11, 1964   4 Sheets-Sheet 1
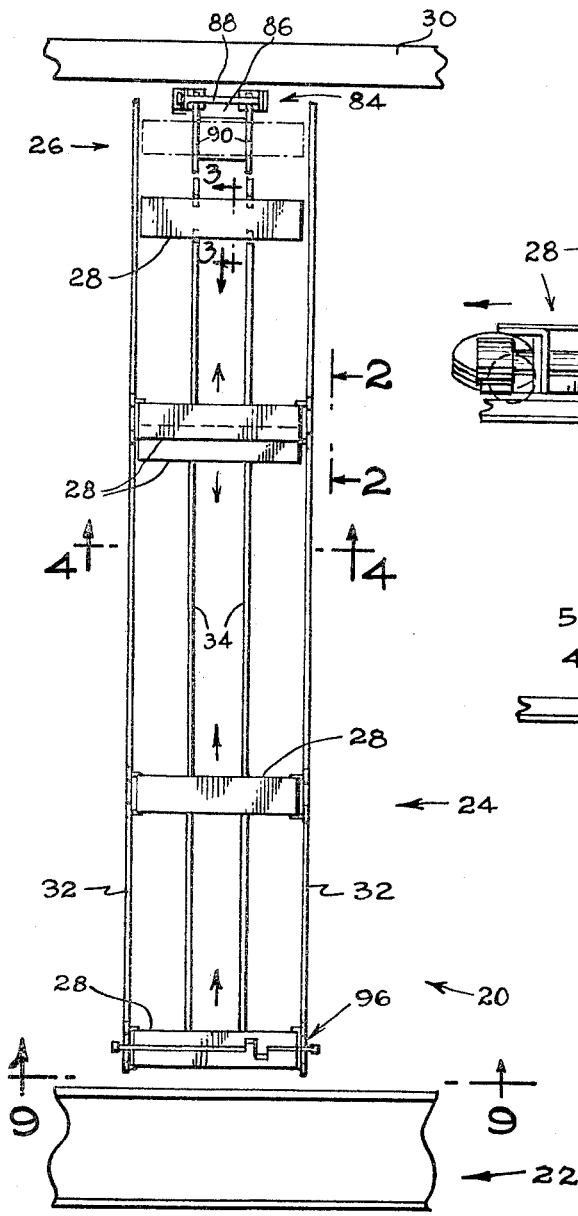
FIG. 1
FIG. 2
FIG. 3
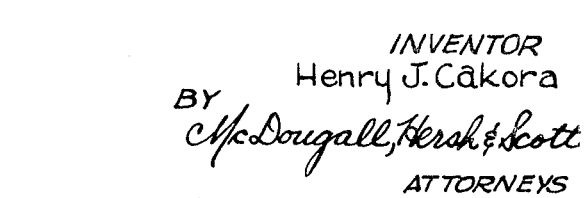
INVENTOR
Henry J. Cakora
BY
McDougall, Hersh & Scott
ATTORNEYS

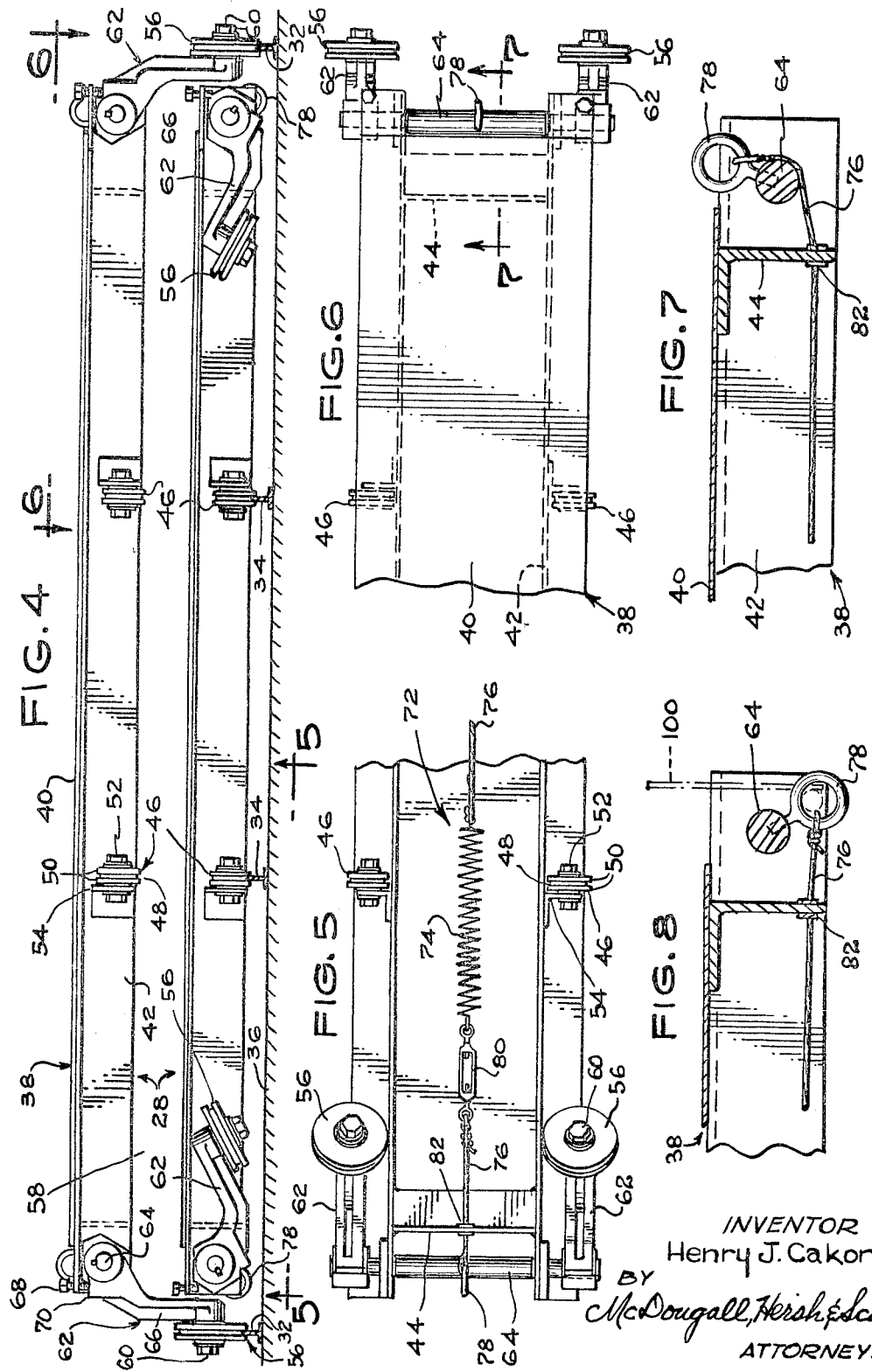

Sept. 13, 1966      H. J. CAKORA      3,272,147
CART SYSTEM FOR FOUNDRIES OR THE LIKE
Filed May 11, 1964      4 Sheets-Sheet 3

INVENTOR
Henry J. Cakora
BY
McDougall, Hersh & Scott
ATTORNEYS

Sept. 13, 1966          H. J. CAKORA          3,272,147
CART SYSTEM FOR FOUNDRIES OR THE LIKE
Filed May 11, 1964          4 Sheets-Sheet 4
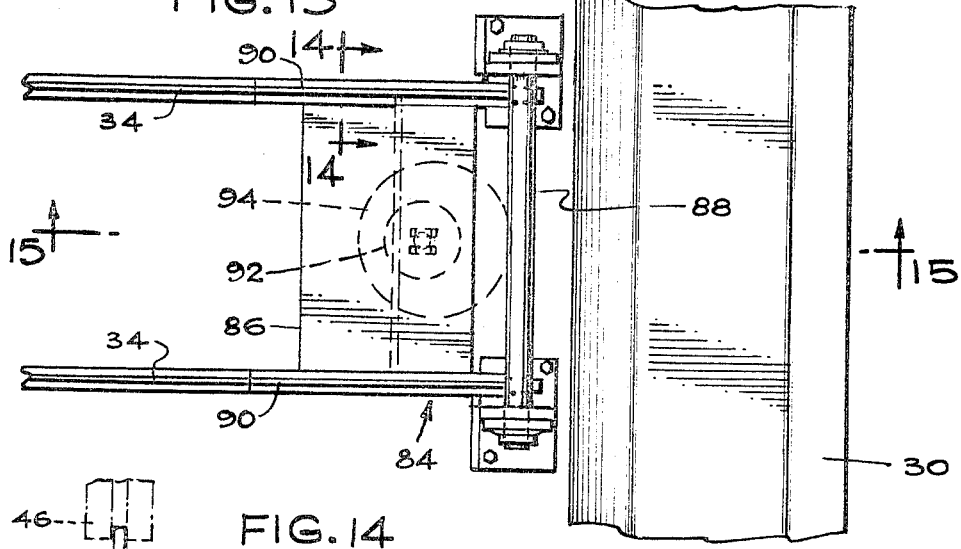
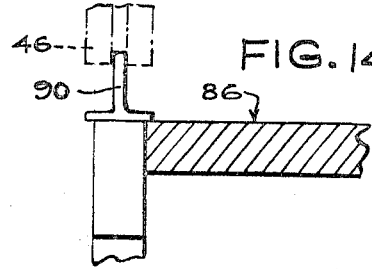
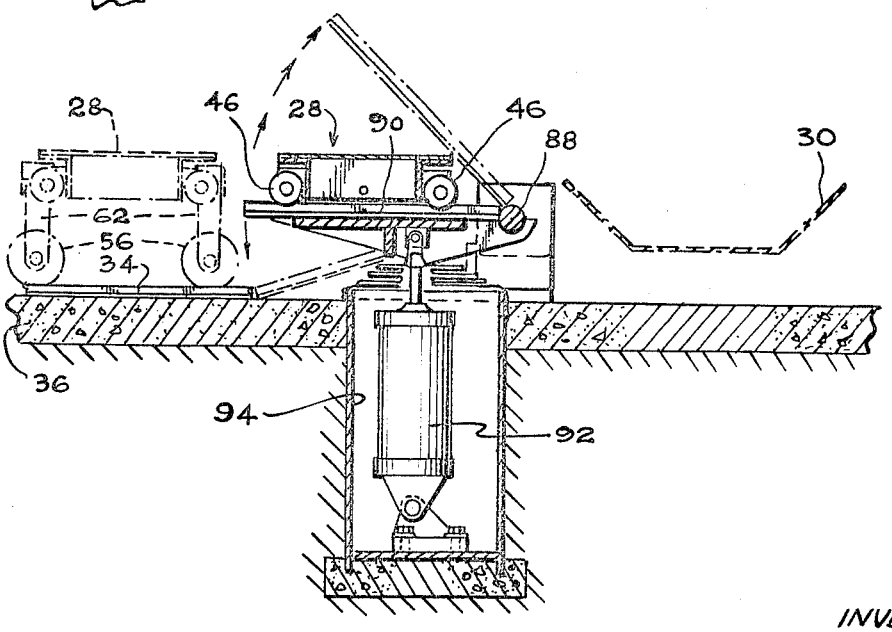
INVENTOR
Henry J. Cakora
BY
McDougall, Hersh & Scott
ATTORNEYS United States Patent Office 3,272,147
Patented Sept. 13, 1966

3,272,147
CART SYSTEM FOR FOUNDRIES OR THE LIKE
Henry J. Cakora, Pekin, Ill., assignor to Tazewell Machine Works, Inc., Pekin, Ill., a corporation of Illinois
Filed May 11, 1964, Ser. No. 366,528
14 Claims. (Cl. 104—1)

This invention relates to a new and improved cart system which is especially useful in foundries or the like for carrying pallets on which molds are supported.

The present invention relates to foundries in which molds, made of molded sand or the like, are deposited on boards or pallets which are then carried by carts along rails to a station at which molten metal is poured into the molds. The carts are then moved along the rails to a station at which the molds and the solidified metal castings therein are dumped off the carts into a conveyor. The carts are then returned to their starting positions to receive a new set of molds.

One object of the present invention is to provide a new and improved cart system in which the outbound carts travel on wide gauge wheels supported on wide gauge rails, while the inbound carts travel on narrow gauge wheels supported on narrow gauge tracks, the wide and narrow gauge tracks being at substantially the same elevation so that both sets of tracks may simply be secured to the floor of the foundry.

A further object is to provide such a new and improved system in which the wide gauge wheels are movable between retracted positions, in which the narrow gauge wheels project below the wide gauge wheels, and extended positions in which the wide gauge wheels project below the narrow gauge wheels.

Another object is to provide such a new and improved system in which the wide gauge wheels, when extended, are displaced downwardly and outwardly from the cart so as to provide sufficient space under the cart for the passage of another cart with the wide gauge wheels retracted. In this way, the outbound carts, supported by the wide gauge wheels, are able to pass over the inbound carts, supported by the narrow gauge wheels.

A further object is to provide such a new and improved system having means at the outer end of the rails for transferring the carts from the wide gauge rails to the narrow gauge rails, while the wide gauge wheels are automatically moved to their retracted positions.

Another object is to provide a new and improved system of the foregoing character and having means at the inner end of the rails for lifting the carts while automatically extending the wide gauge wheels to support the carts in an elevated position on the wide gauge rails.

It is a further object to provide new and improved carts with extensible wide gauge wheels for use in such a cart system.

Further objects and advantages of the present invention will appear from the following description, taken with the accompanying drawings, in which:

FIG. 1 is a fragmentary diagrammatic plan view showing a portion of a foundry layout utilizing a pallet cart system to be described as an illustrative embodiment of the present invention.

FIG. 2 is a side elevational view showing an inbound cart passing under an outbound cart, the view being taken generally as indicated by the line 2—2 in FIG. 1.

FIG. 3 is a cross-sectional view through one of the inbound carts, taken generally along the line 3—3 in FIG. 1.

FIG. 4 is a front elevational view, partly in section, showing an inbound cart passing under an outbound cart, the view being taken generally along the line 4—4 in FIG. 1

FIG. 5 is a fragmentary bottom view of one of the carts with the wide gauge wheels retracted, the view being taken generally as indicated by the line 5—5 in FIG. 4.

FIG. 6 is a fragmentary top view of one of the carts with the wide gauge wheels extended, the view being taken generally as indicated by the line 6—6 in FIG. 4.

FIG. 7 is a fragmentary sectional view taken generally along the line 7—7 in FIG. 6.

FIG. 8 is a view similar to FIG. 7, but with some of the parts in the changed positions which they occupy when the wide gauge wheels are retracted.

FIG. 13 is a fragmentary plan view showing the device for tilting the carts and transferring them to the narrow gauge rails at the outer end of the rails.

FIG. 14 is a fragmentary enlarged cross-section taken generally along the line 14—14 in FIG. 13.

FIG. 15 is a longitudinal section taken along the line 15—15 in FIG. 13.

Figure 9:
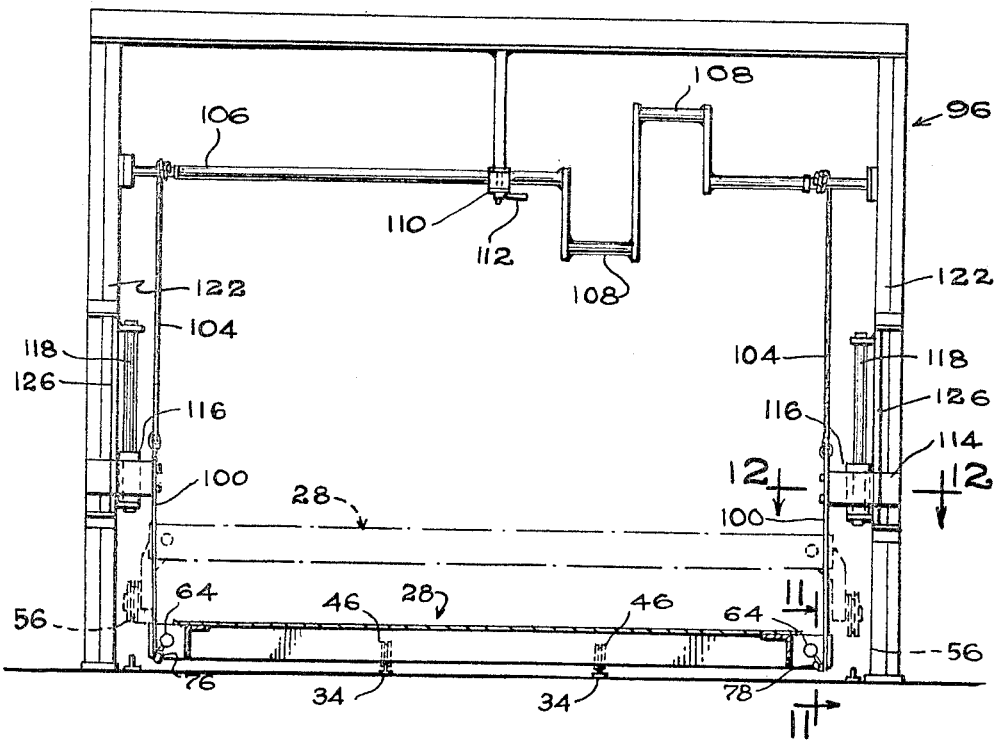
FIG. 9 is an elevational view showing the device for lifting the carts at the inner end of the rails, the view being taken generally as indicated by the line 9—9 in FIG. 1.
Figure 10:
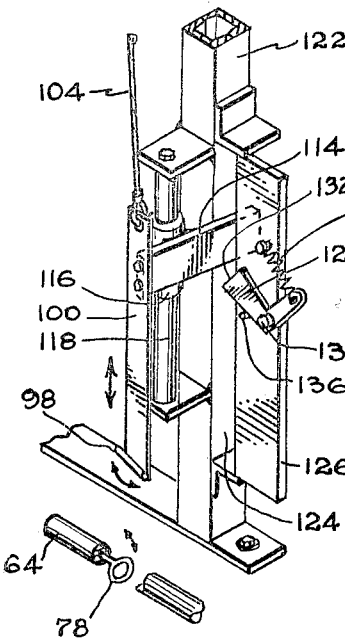
FIG. 10 is a fragmentary perspective view showing details of the lifting device.
Figure 11:
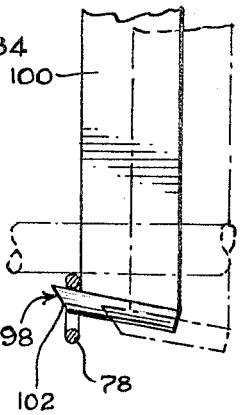
FIG. 11 is a fragmentary enlarged elevational section, taken generally along the line 11—11 in FIG. 9 and showing one of the hooks for lifting the carts.

As already indicated, FIG. 1 illustrates a pallet cart system 20 for use in a foundry or the like. The general purpose of the cart system is to carry molds from the mold-making machine 22 to the station 24 where the molds are filled with molten metal, and thence to a station 26 where the molds are separated or broken away from the solidified metal castings. In general, the cart system 20 comprises a plurality of carts 28 which are adapted to support the molds, either directly on the carts or on pallets or boards which are placed on the carts. The system or apparatus 20 normally employs quite a number of the carts so as to hold the desired number of molds. It will be understood that the molds must remain on the carts long enough to allow the molten metal to cool so that it will solidify. The distance between the mold-making machine 22 and the outer station 26 is made sufficiently great to allow for the cooling of the metal. At the outer or terminal station 26, the molds are dumped from the carts into a conveyor 30. In the conveyor, the molds are broken up so that the castings may be removed from the molds. Normally the molds are made from pressed or molded foundry sand. Thus, the molds are quite fragile and are easily broken loose from the castings. The impact resulting from the dumping of the molds into the conveyor 30 usually causes the breakage of the molds so that the castings may immediately be removed from the conveyor. The sand from the used molds is normally recovered and is carried by the conveyor 30 to a bin or the like from which the sand is returned to the mold-making machine for re-use.

The pallet carts 28 travel in an outbound direction between the mold-making machine 22 and the dumping station 26 along a pair of wide gauge parallel rails or tracks 32. The carts are returned from the dumping station 26 to the mold-making machine 22 along a pair of parallel narrow gauge rails or tracks 34 which are located centrally between the wide gauge rails 32. In accordance with one of the features of the present invention, all of the wide and narrow gauge rails 32 and 34 are at substantially the same elevation. Thus, both sets of rails 32 and 34 may simply be laid upon and secured to the concrete floor 36 of the foundry. There is no need to elevate or depress any of the rails, as has been necessary in the case of prior pallet cart systems. In accordance with the present invention, each of the carts 28 is supported at a substantially higher elevation when it is travelling on the wide gauge tracks 32 than when it is travelling on the narrow gauge tracks 34 so that the inbound carts on the narrow gauge tracks are able to pass under the outbound carts on the wide gauge tracks. Thus, the empty carts may be returned to the starting point without interfering with the outward movement of the loaded carts. FIGS. 2 and 4 illustrate very clearly the manner in which the returning carts pass under the outbound carts.

It will be seen that each cart 28 comprises a body or bed 38 which in this case comprises a flat top plate 40 secured to a pair of main cross bars or frame members 42. A pair of shorter frame bars 44 extend between the end portions of the bars 42.

Each cart 28 is equipped with a plurality of narrow gauge wheels 46 adapted to engage the narrow gauge tracks 34. Each of the illustrated wheels 46 is formed with a central groove 48 and a pair of flanges 50 to retain the wheel on the rail. Each wheel is rotatably mounted on an axle 52 which is supported by a bracket 54 secured to one of the frame bars 42. It will be seen that the narrow gauge wheels 46 project only slightly below the body 38 of the cart so that the cart is supported just above the narrow gauge rails 34 when the narrow gauge wheels 46 are in use. Each cart 38 has four of the narrow gauge wheels 46.

Each cart 28 also has a plurality of wide gauge wheels 56 adapted to engage the wide gauge rails 32. Four of the wheels 56 are provided on each of the illustrated carts. The wide gauge wheels 56 are mounted on the carts in such a manner that they may be moved between extended and retracted positions, as represented by the two carts shown in FIG. 4. When the wide gauge wheels 56 are extended, they project substantially below the narrow gauge wheels 46 so that the cart body 38 is elevated to a considerable extent. Thus, the narrow gauge wheels 46 are elevated well above the narrow gauge tracks 34. A space 58 is provided under the elevated cart body 38 and is larger in size than the size of the cart with the wide gauge wheels retracted, so that the returning carts can pass through the space 58 and under the elevated outbound carts.

As shown in FIG. 2 and 4, each of the wide gauge wheels 56 is rotatably mounted on an axle 60 which is secured to the lower end of a swingable supporting arm 62. Thus, there are four of the arms 62. On each side of the cart 28, two of the arms 62 are secured to the opposite ends of a shaft 64 which is rotatably mounted on the cart body 38. Each shaft 64 is horizontal and extends parallel to the direction of movement of the cart.

When the wide gauge wheels 56 are extended, the arms 62 project downwardly and outwardly from the cart body 38 to provide sufficient clearance under the cart for the returning carts. Each arm 62 has a lower portion 66 which is offset outwardly in a lateral direction from the cart body 38. The outward swinging movement of the arms 62 is limited by adjustable stop screws 68 on the cart body 38. Each arm 62 has a shoulder 70 which is engageable with one of the stop screws 68. The exact distance between the wide gauge wheels 56 may be adjusted by turning the stop screws 68.

When the wide gauge wheels 56 are retracted, the wheels and the arms 62 are swung upwardly and inwardly under the cart body 38 so as to clear the floor 36 on which the rails 32 and 34 are mounted. The wide gauge wheels 56 are preferably biased to their retracted positions by a spring biasing arrangement 72. In this way, the wide gauge wheels 56 are retracted automatically when the weight of the cart is removed from the wide gauge wheels. As shown, the biasing mechanism 72 comprises a coiled tension spring 74 having its opposite ends connected to cables or lines 76. The opposite ends of the cables 76 are connected to eyebolts 78 which project outwardly from the shafts 64. A turn buckle 80 may be connected into one of the cables 76 to adjust the initial tension in the spring 74. As shown, each cable 76 passes through a grommeted opening 82 in one of the frame bars 44. When the arms 62 are retracted the eye-bolts 78 angle downwardly and outwardly. When the arms 62 are extended, each cable 76 is wrapped part way around the corresponding shaft 64 as shown in FIG. 7. The extending movement of the arms 62 causes considerable stretching of the spring 74 so that the arms 62 are immediately retracted when the weight of the cart is shifted from the wide gauge wheels 56 to the narrow gauge wheels 46.

A mechanism 84 (FIGS. 13–15) is provided at the dumping station 26 for tilting each of the loaded carts 28 so as to dump the molds into the conveyor 30. The cart is then tilted in the opposite direction so as to transfer the cart to the narrow gauge rails 34. Thus, the mechanism 84 comprises a tiltable member or frame 86 which is supported by a rock shaft 88. A pair of narrow gauge rail sections 90 are mounted on the tiltable frame 86 for engaging the narrow gauge wheels 46 on each of the carts 28. The swingable frame 86 is adapted to be operated by a fluid power cylinder 92 which in this case is mounted in a pit 94 formed in the floor 36 below the frame 86.

When each cart arrives at the dumping station 26, the narrow gauge wheels 46 move over the narrow gauge rail sections 90. The fluid power cylinder 92 is then actuated so as to swing the frame 86 upwardly. The narrow gauge rail sections 90 move upwardly under the narrow gauge wheels 46 and lift the cart 28 so that the weight of the cart is transferred from the wide gauge wheels 56 to the narrow gauge wheels 46. When the wide gauge wheels clear the wide gauge rails 32, the wide gauge wheels are retracted by the spring 74. The cart 28 may be clamped, blocked, or otherwise secured to the frame 86. The cylinder 92 is then actuated so as to tilt the frame 86 and the cart toward the conveyor 30 so that the molds will slide off the cart and into the conveyor. The cylinder 92 is then operated in the opposite direction so as to tilt the frame 86 downwardly toward the narrow gauge rails 34. The ends of the narrow gauge rail sections 90 are thus moved opposite the ends of the narrow gauge rails 34. The cart 28 is then allowed to roll off the narrow gauge rail sections 90 and onto the rails 34.

The cart 28 is returned along the narrow gauge rails 34 to its original position adjacent the mold-making machine 22. During its return movement, the cart passes under any outbound carts, as shown in FIGS. 2 and 4. Generally, there are several outbound carts and several inbound carts on the rails 32 and 34 simultaneously.

At the starting point adjacent the mold-making machine 22, a mechanism 96 is provided for lifting each of the carts and extending the wide gauge wheels 56 for engagement with the wide gauge rails 32. The lifting mechanism 96 is shown to best advantage in FIGS. 9–12. The lifting force is applied to the eyebolts 78 so that the lifting force is effective to swing the eyebolts upwardly to the position shown in FIG. 7. Thus, the lifting force is utilized to swing the wheel-supporting arms 62 to their extended positions against the biasing action of the spring 74. The wide gauge wheels 56 may then be placed on the tracks 32.

To engage the eyebolts 78, the lifting mechanism 96 is provided with hooks or prongs 98 which are mounted on the lower ends of flexible bars or leaf-springs 100. As shown, each hook 98 is in the form of a piece of rod welded or otherwise secured to the lower end of the corresponding bar 100, the hook being inclined upwardly at a small angle. A bevelled surface 102 is formed on the lower side of the hook 92 to facilitate the engagement of the hook with the eyebolt 78.

Each of the bars 100 is guided for vertical movement and is adapted to be pulled upwardly by a cable or line 104 which is wrapped around a shaft 106, adapted to act as the winding drum of a winch. A pair of hand cranks 108 are connected between the shafts 106 for rotating them so as to raise the hooks 98. One of the shafts 106 passes through a clamp or brake 110 which includes a hand screw 112 which may be tightened to prevent rotation of the shafts 106.

Each of the hook bars 100 is mounted on a block or bar 114 which in turn is secured to a guide sleeve 116 slidably received around a vertical guide rod 118. The ends of the rod 118 are supported by brackets 120 secured to a post or upright bar 122. It will be seen that the outer portion of the bar 114 extends through an oversized guide slot 124 which is formed between the post 122 and a vertical guide bar 126. The slot 124 is sufficiently large to permit the sleeve 116 to swivel to a limited extent about the cylindrical rod 118. Such swiveling movement facilitates the downward movement of the hook 98 so that the hook may easily be inserted into the eyebolt 78.

Figure 12:
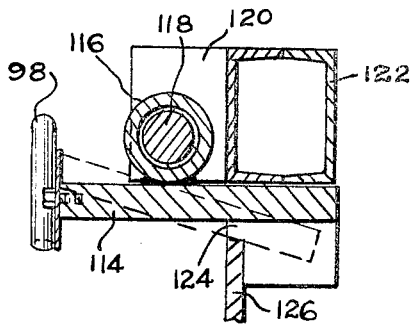
FIG. 12 is a fragmentary horizontal section taken generally along the line 12—12 in FIG. 9.

Normally, the pull on the cable 104 causes the bar 100 and the sleeve 116 to swivel so that the bar 114 slides along the vertical guide bar 126 as shown in broken lines in FIG. 12. This swiveling movement is due to the fact that the cable 104 angles slightly in its flight upwardly from the bar 100 to the shaft 106. Means are preferably provided for automatically swiveling the hook 98 in the opposite direction toward the position shown in full lines in FIG. 12, as the hook is moved downwardly. For this purpose, the lever or arm 128 is swingably mounted on a pivot 130 secured to the vertical bar 126. The lever 128 has an outer edge 132 which serves as a cam and normally projects across a portion of the slot 124. The normal position of the lever 128 is established by a spring 134 which biases the lever 128 against a stop in 136. When the hook bar 100 is moved downwardly, the guide bar 114 engages the cam surface 132 of the lever 128 and is swung counterclockwise toward the full line position of FIG. 12. In this way, the hook 98 is swiveled away from the eyebolt 78 so that the hook is easily able to pass the upper portion of the eyebolt. After the bar 114 passes the lever 128, the hook 98 swivels in the opposite direction so that the hook enters the eyebolt 78. When the hook bar 100 is moved upwardly, the bar 114 again engages the lever 128, but the lever is displaced out of the way, against the biasing force of the spring 134 so that the hook 98 remains in engagement with the eyebolt 78.

It may be helpful to summarize the operation and use of the pallet cart system. At the initial station adjacent the mold-making machine 22, each cart 28 is lifted by the use of the lifting mechanism 96. By means of the hooks 98, the lifting force is applied to the eyebolts 78, with the result that the weight of the cart causes the eyebolts to swing the shafts 64 in such a direction that the wheel-supporting arms 62 are extended. The wide gauge wheels 56 are then placed upon the wide gauge rails or tracks 32. The weight of the cart maintains the wide gauge wheels 56 in their extended positions.

The sand molds produced by the mold-making machine 22 are placed on the carts 28 and the carts are rolled along the wide gauge tracks 32 to the station 24 at which the molten metal is poured into the molds. The carts are then moved along the rails 32 while the metal cools and solidifies.

At the dumping station 26, the narrow gauge wheels 46 move over the rail sections 90 which are then raised by the fluid power cylinder 92 so as to tilt each cart toward the conveyor 30. When the cart is raised off the wide gauge rails 32, the wide gauge wheels 56 are retracted by the spring 74. The sand molds and the castings slide into the conveyor 30, where the sand is removed from the castings so that the castings may be removed from the conveyor.

The fluid power cylinder 92 is operated in the opposite direction so as to tilt the rail sections 90 downwardly into alignment with the narrow gauge rails 34. The cart 28 is then allowed to roll onto the narrow gauge rails, so that the cart may be returned to the mold-making machine 22. Each returning cart passes under each of the outbound carts, as clearly shown in FIGS. 2 and 4. The space under the raised outbound carts, supported on the wide gauge wheels 56, is large enough to provide for the passage of the inbound carts, supported on the narrow gauge wheels 46.

Inasmuch as both the wide and narrow gauge rails are at the same elevation, they may simply be laid on the floor of the foundry. Thus, the rails may be installed at very low cost. Any cart may readily be removed from the rails 32 and 34 if this becomes necessary or desirable. In particular, it is easy to remove the empty carts from the narrow gauge rails if any of the carts need to be serviced, or if the carts are needed elsewhere. The typical foundry has several cart systems, and with the system of the present invention, the carts may easily be shifted from one system to another. The retractable wheels add very little to the cost of the carts so that the entire system is highly economical.

Various other modifications, alternative constructions and equivalents may be employed without departing from the true spirit and scope of the invention, as exemplified in the foregoing description and defined in the following claims.

I claim:
1. In a cart system for foundries or the like,
the combination comprising a pair of parallel wide gauge rails,
a pair of parallel narrow gauge rails disposed centrally between said wide gauge rails,
said wide and narrow gauge rails being at substantially the same elevation,
a plurality of carts,
each cart having a pair of wheel-supporting arms mounted thereon for swinging movement between retracted and extended positions,
a plurality of wide gauge wheels mounted on said arms and engageable with said wide gauge rails,
said arms projecting downwardly and outwardly from said cart when said arms are in said extended position to locate said wide gauge wheels opposite said wide gauge rails,
a plurality of narrow gauge wheels mounted on each cart and engageable with said narrow gauge rails,
said wide gauge wheels being at a substantially lower elevation than said narrow gauge wheels when said arms are extended,
a tiltable member at one end of said wide gauge rails and including a pair of narrow gauge rail sections at a higher elevation than said wide and narrow gauge rails,
said tiltable member being swingable in one direction to move said narrow gauge rail sections upwardly under said narrow gauge wheels so as to raise said cart off said wide gauge rails,
spring means on each cart for moving said arms to said retracted position when the weight of the cart is removed from said wide gauge wheels,
said wide gauge wheels being swung upwardly and inwardly under the cart when said arms are retracted so that said narrow gauge wheels will project below said wide gauge wheels,
said tiltable member being swingable in the opposite direction to move said narrow gauge rail sections downwardly opposite said narrow gauge rails for directing the cart onto said narrow gauge rails,
the cart on said wide gauge rails being raised above said narrow gauge rails by said arms and thereby affording room under said cart for the passage of another cart on said narrow gauge rails, inbound carts on said narrow gauge rails thereby being able to pass under outbound carts on said wide gauge rails, means forming a pair of eyes on said arms for use in lifting said carts, and a lifting device at the opposite end of said rails and including hooks for engaging said eyes and lifting the cart, the weight of the cart thereupon being effective to swing said arms outwardly to their extended positions to locate said wide gauge wheels for reengagement with said wide gauge rails.

2. In a cart, the combination comprising a body having a plurality of narrow gauge wheels rotatably mounted thereon, a pair of wide gauge supporting arms mounted on said body for swinging movement between retracted and extended positions, a plurality of wide gauge wheels rotatably mounted on said arms, and spring means biasing said arms to said retracted position, said narrow gauge wheels projecting below said wide gauge wheels and being adapted to support the cart when said arms are retracted, said arms projecting outwardly and downwardly so that said wide gauge wheels project substantially below said narrow gauge wheels when said arms are extended, said wide gauge wheels and said arms when extended affording a space under said cart of a size exceeding the size of said cart when said arms are retracted, whereby one cart with arms retracted is able to pass under another cart with said arms extended.

3. In a cart system, the combination comprising a pair of parallel wide gauge rails, a pair of parallel narrow gauge rails disposed between said wide gauge rails and at substantially the same elevation as said wide gauge rails, a plurality of carts movable outbound on said wide gauge rails and inbound on said narrow gauge rails, each of said carts having a plurality of narrow gauge wheels engageable with said narrow gauge rails, each cart having a pair of wide gauge arms swingable between retracted and extended positions, a plurality of wide gauge wheels mounted on said arms, said narrow gauge wheels projecting below said wide gauge wheels when said arms are retracted, said wide gauge wheels projecting substantially below said narrow gauge wheels when said arms are extended, said arms projecting downwardly from each cart and affording a space under said cart of a size exceeding the size of said cart when said arms are retracted, whereby an inbound cart supported on said narrow gauge wheels is able to pass under an outboard cart supported on said wide gauge wheels, means at the outer end of said rails for transferring said carts from said wide gauge rails to said narrow gauge rails while said arms are moved from extended to retracted positions, and means at the inner end of said rails for raising the carts and extending the arms to transfer the carts from said narrow gauge rails to said wide gauge rails.

4. In a cart, the combination comprising a body having a plurality of narrow gauge wheels rotatably mounted thereon, a plurality of rotatable wide gauge wheels, means mounting said wide gauge wheels on said body for movement between retracted and extended positions, biasing means urging said wide gauge wheels toward said retracted position, said narrow gauge wheels projecting below said wide gauge wheels and being adapted to support said cart when said wide gauge wheels are retracted, said wide gauge wheels being displaced downwardly below said narrow gauge wheels when said wide gauge wheels are extended, said wide gauge wheels when extended affording a space under said cart of a size exceeding the size of said cart when said wide gauge wheels are retracted, whereby one cart with the wide gauge wheels retracted is able to pass under another cart with the wide gauge wheels extended.

5. In a cart system, the combination comprising a pair of parallel wide gauge rails, a pair of parallel narrow gauge rails disposed between said wide gauge rails and at substantially the same elevation as said wide gauge rails, a plurality of carts movable in one direction on said wide gauge rails and in the opposite direction on said narrow gauge rails, each of said carts having a plurality of narrow gauge wheels rotatably mounted thereon and engageable with said narrow gauge rails, each cart having a plurality of rotatable wide gauge wheels and means mounting said wide gauge wheels on said cart for movement between retracted and extended positions, said narrow gauge wheels projecting below said wide gauge wheels when retracted, said wide gauge wheels when extended projecting below said narrow gauge wheels and affording a space under said cart of a size exceeding the size of said cart when said wide gauge wheels are retracted, whereby a cart supported on said narrow gauge wheels is able to pass under another cart supported on said wide gauge wheels, means at one end portion of said rails for transferring said carts from said wide gauge rails to said narrow gauge rails while said wide gauge wheels are moved from extended to retracted positions, and means at the opposite end portion of said rails for raising the carts and extending the wide gauge wheels to transfer the carts from said narrow gauge rails to said wide gauge rails.

6. In a cart, the combination comprising a body having a plurality of narrow gauge wheels rotatably mounted thereon, a plurality of rotatable wide gauge wheels, means mounting said wide gauge wheels on said body for movement between retracted and extended positions, said narrow gauge wheels projecting below said wide gauge wheels and being adapted to support said cart when said wide gauge wheels are retracted, said wide gauge wheels being displaced downwardly below said narrow gauge wheels when said wide gauge wheels are extended, said wide gauge wheels when extended affording a space under said cart of a size exceeding the size of said cart when said wide gauge wheels are retracted, whereby one cart with the wide gauge wheels retracted is able to pass under another cart with the wide gauge wheels extended.

7. In a cart, the combination comprising a body having a plurality of narrow gauge wheels rotatably mounted thereon, a plurality of rotatable wide gauge wheels, means mounting said wide gauge wheels on said body for movement between retracted and extended positions, biasing means urging said wide gauge wheels toward said retracted position, movable elements connected to said first-mentioned means and operable by upward force to move said wide gauge wheels to their extended positions whereby hoisting force applied to said elements will simultaneously lift the cart and extend said wide gauge wheels, said narrow gauge wheels projecting below said wide gauge wheels and being adapted to support said cart when said wide gauge wheels are retracted, said wide gauge wheels being displaced downwardly below said narrow gauge wheels when said wide gauge wheels are extended, said wide gauge wheels when extended affording a space under said cart of a size exceeding the size of said cart when said wide gauge wheels are retracted, whereby one cart with the wide gauge wheels retracted is able to pass under another cart with the wide gauge wheels extended.

8. In a cart, the combination comprising a body having a plurality of narrow gauge wheels rotatably mounted thereon, wide gauge supporting arms mounted on said body for swinging movement between retracted and extended positions, a plurality of wide gauge wheels rotatably mounted on said arms, spring means biasing said arms to said retracted position, said narrow gauge wheels projecting below said wide gauge wheels and being adapted to support the cart when said arms are retracted, said arms projecting outwardly and downwardly so that said wide gauge wheels project substantially below said narrow gauge wheels when said arms are extended, said wide gauge wheels and said arms when extended affording a space under said cart of a size exceeding the size of said cart when said arms are retracted, whereby one cart with arms retracted is able to pass under another cart with said arms extended, and hoisting elements connected to said arms and operable by upward hoisting force to extend said arms automatically when the cart is hoisted.

9. In a cart, the combination comprising a body having a plurality of narrow gauge wheels rotatably mounted thereon, wide gauge supporting arms mounted on said body for swinging movement between retracted and extended positions, a plurality of wide gauge wheels rotatably mounted on said arms, spring means biasing said arms to said retracted position, said narrow gauge wheels projecting below said wide gauge wheels and being adapted to support the cart when said arms are retracted, said arms projecting outwardly and downwardly so that said wide gauge wheels project substantially below said narrow gauge wheels when said arms are extended, said wide gauge wheels and said arms when extended affording a space under said cart of a size exceeding the size of said cart when said arms are retracted, whereby one cart with arms retracted is able to pass under another cart with said arms extended, and eyebolts connected to and swingable with said arms and operable by upward hoisting force for automatically extending said arms when the cart is hoisted.

10. In a cart system, the combination comprising a pair of parallel wide gauge rails, a pair of parallel narrow gauge rails disposed between said wide gauge rails and at substantially the same elevation as said wide gauge rails, and a plurality of carts movable in one direction on said wide gauge rails and in the opposite direction on said narrow gauge rails, each of said carts having a plurality of narrow gauge wheels rotatably mounted thereon and engageable with said narrow gauge rails, each cart having a plurality of rotatable wide gauge wheels and means mounting said wide gauge wheels on said cart for movement between retracted and extended positions, said narrow gauge wheels projecting below said wide gauge wheels when retracted, said wide gauge wheels when extended projecting below said narrow gauge wheels and affording a space under said cart of a size exceeding the size of said cart when said wide gauge wheels are retracted, whereby a cart supported on said narrow gauge wheels is able to pass under another cart supported on said wide gauge wheels.

11. In a cart system, the combination comprising a pair of parallel wide gauge rails, a pair of parallel narrow gauge rails disposed between said wide gauge rails and at substantially the same elevation as said wide gauge rails, a plurality of carts movable in one direction on said wide gauge rails and in the opposite direction on said narrow gauge rails, each of said carts having a plurality of narrow gauge wheels rotatably mounted thereon and engageable with said narrow gauge rails, each cart having a plurality of rotatable wide gauge wheels and means mounting said wide gauge wheels on said cart for movement between retracted and extended positions, said narrow gauge wheels projecting below said wide gauge wheels when retracted, said wide gauge wheels when extended projecting below said narrow gauge wheels and affording a space under said cart of a size exceeding the size of said cart when said wide gauge wheels are retracted, whereby a cart supported on said narrow gauge wheels is able to pass under another cart supported on said wide gauge wheels, means at one end portion of said rails for transferring said carts from said wide gauge rails to said narrow gauge rails while said wide gauge wheels are moved from extended to retracted positions, hoisting means at the opposite end portion of said rails for raising the carts to transfer the carts from said narrow gauge rails to said wide gauge rails, and elements connected to said wide gauge wheels and engageable by said hoisting means for automatically extending said wide gauge wheels by the application of hoisting force to said elements.

12. In a cart system, the combination comprising a pair of parallel wide gauge rails, a pair of parallel narrow gauge rails disposed between said wide gauge rails and at substantially the same elevation as said wide gauge rails, a plurality of carts movable outbound on said wide gauge rails and inbound on said narrow gauge rails, each of said carts having a plurality of narrow gauge wheels engageable with said narrow gauge rails, each cart having a plurality of wide gauge arms swingable between retracted and extended positions, a plurality of wide gauge wheels mounted on said arms, said narrow gauge wheels projecting below said wide gauge wheels when said arms are retracted, said wide gauge wheels projecting substantially below said narrow gauge wheels when said arms are extended,
said arms projecting downwardly from each cart and affording a space under said cart of a size exceeding the size of said cart when said arms are retracted,
whereby an inbound cart supported on said narrow gauge wheels is able to pass under an outbound cart supported on said wide gauge wheels,
means at the outer end of said rails for transferring said carts from said wide gauge rails to said narrow gauge rails while said arms are moved from extended to retracted positions,
hoisting means at the inner end of said rails for raising the carts to transfer the carts from said narrow gauge rails to said wide gauge rails,
and hoisting eye elements connected to said arms and engageable by said hoisting means for automatically extending said arms responsive to the application of hoisting force to said elements.

13. In a cart system,
the combination comprising a pair of parallel wide gauge rails,
a pair of parallel narrow gauge rails disposed between said wide gauge rails and at substantially the same elevation as said wide gauge rails,
a plurality of carts movable outbound on said wide gauge rails and inbound on said narrow gauge rails,
each of said carts having a plurality of narrow gauge wheels engageable with said narrow gauge rails,
each cart having a plurality of wide gauge arms swingable between retracted and extended positions,
a plurality of wide gauge wheels mounted on said arms,
said narrow gauge wheels projecting below said wide gauge wheels when said arms are retracted,
said wide gauge wheels projecting substantially below said narrow gauge wheels when said arms are extended,
said arms projecting downwardly from each cart and affording a space under said cart of a size exceeding the size of said cart when said arms are retracted,
whereby an inbound cart supported on said narrow gauge wheels is able to pass under an outbound cart supported on said wide gauge wheels,
means at the outer end of said rails for transferring said carts from said wide gauge rails to said narrow gauge rails while said arms are moved from extended to retracted positions,
hoisting means at the inner end of said rails for raising the carts to transfer the carts from said narrow gauge rails to said wide gauge rails,
and eyebolts on said carts and engageable by said hoisting means for lifting the carts,
said hoisting means including hooks movable vertically and engageable with said eyebolts,
said hoisting means including means operable by downward movement of said hooks for retracting said hooks to enable said hooks to pass below said eyebolts,
said last-mentioned means thereupon being effective to advance said hooks for engagement with said eyebolts.

14. In a cart system,
the combination comprising a pair of parallel wide gauge rails,
a pair of parallel narrow gauge rails disposed between said wide gauge rails and at substantially the same elevation as said wide gauge rails,
a plurality of carts movable outbound on said wide gauge rails and inbound on said narrow gauge rails,
each of said carts having a plurality of narrow gauge wheels engageable with said narrow gauge rails,
each cart having a plurality of wide gauge arms swingable between retracted and extended positions,
a plurality of wide gauge wheels mounted on said arms,
said narrow gauge wheels projecting below said wide wheels when said arms are retracted,
said wide gauge wheels projecting substantially below said narrow gauge wheels when said arms are extended,
said arms projecting downwardly from each cart and affording a space under said cart of a size exceeding the size of said cart when said arms are retracted,
whereby an inbound cart supported on said narrow gauge wheels is able to pass under an outboard cart supported on said wide gauge wheels,
means at the outer end of said rails for transferring said carts from said wide gauge rails to said narrow gauge rails while said arms are moved from extended to retracted positions,
hoisting means at the inner end of said rails for raising the carts to transfer the carts from said narrow gauge rails to said wide gauge rails,
and eyebolts connected to said arms and engageable by said hoisting means for automatically extending said arms by the application of hoisting force to said eyebolts,
said hoisting means including hooks movable vertically and engageable with said eyebolts,
and means effective upon downward movement of said hooks for momentarily retracting said hooks to enable said hooks to pass under said eyebolts.

References Cited by the Examiner

UNITED STATES PATENTS 765,211  7/1904  Thompson _____ 105—178

FOREIGN PATENTS 101,942  8/1937  Australia.

ARTHUR L. LA POINT, *Primary Examiner.*

D. F. WORTH, *Assistant Examiner.*